United States Patent
Eckersley et al.

(10) Patent No.: US 9,676,500 B2
(45) Date of Patent: Jun. 13, 2017

(54) METHOD OF SOLAR OCCULTATION

(71) Applicant: AIRBUS DEFENCE AND SPACE LIMITED, Hertfordshire (GB)

(72) Inventors: Steve Eckersley, Hertfordshire (GB); Stephen Kemble, Hertfordshire (GB)

(73) Assignee: Airbus Defence and Space Limited, Hertfordshire (GB)

( * ) Notice: Subject to any disclaimer, the term of this patent is extended or adjusted under 35 U.S.C. 154(b) by 126 days.

(21) Appl. No.: 14/386,403

(22) PCT Filed: Feb. 25, 2013

(86) PCT No.: PCT/EP2013/053745
§ 371 (c)(1),
(2) Date: Sep. 19, 2014

(87) PCT Pub. No.: WO2013/139560
PCT Pub. Date: Sep. 26, 2013

(65) Prior Publication Data
US 2015/0102173 A1    Apr. 16, 2015

(30) Foreign Application Priority Data
Mar. 20, 2012  (EP) .................................. 12275027

(51) Int. Cl.
*B64G 1/24* (2006.01)
*B64G 1/10* (2006.01)

(52) U.S. Cl.
CPC ............... *B64G 1/24* (2013.01); *B64G 1/105* (2013.01); *B64G 1/1085* (2013.01); *B64G 1/242* (2013.01); *B64G 2001/1064* (2013.01)

(58) Field of Classification Search
CPC .......... B64G 1/24; B64G 1/105; B64G 1/242; B64G 1/14; B64G 1/245; B64G 1/247;
(Continued)

(56) References Cited

U.S. PATENT DOCUMENTS

| 4,923,293 A * | 5/1990 | Nelles .................... G02B 5/005 |
| | | 359/362 |
| 7,784,740 B2 | 8/2010 | Massonnet |

(Continued)

OTHER PUBLICATIONS

"International Search Report for PCT/EP2013/053745 dated Jun. 27, 2013".
(Continued)

*Primary Examiner* — Abby Lin
(74) *Attorney, Agent, or Firm* — KramerAmado, P.C.

(57) ABSTRACT

A method of solar occultation, and in particular solar coronagraphy, employing a spacecraft 200 is disclosed. The spacecraft is controlled to achieve a position within a target zone relative to a celestial body, such as the Moon, such that the celestial body occults the Sun, allowing observations of the Sun or the space around the Sun, and in particular the Sun's corona, to be made from the spacecraft. The spacecraft has an orbit 40 around the Earth in a plane S, which like the Moon's orbit 20 in plane M, is inclined relative to the ecliptic plane E. Once inside the target zone, the spacecraft's orbit is controlled such that it remains in the target zone for longer than it would otherwise. This is achieved through the orbit within the target zone being at least partly non-Keplerian, when the orbit is under the influence of spacecraft translational thrust for example. The invention also extends to a method of controlling a spacecraft, to a spacecraft, and to a solar coronagraph comprising a spacecraft and a celestial body.

9 Claims, 9 Drawing Sheets

(58) Field of Classification Search
CPC . B64G 1/32; B64G 2001/1064; B64G 1/1085
See application file for complete search history.

(56) References Cited

U.S. PATENT DOCUMENTS

2009/0101758 A1    4/2009  Leyre
2013/0062471 A1*   3/2013  Lim .................... B64G 1/1007
                                                  244/158.6

OTHER PUBLICATIONS

Csoeke-Poeckh, et al., "Measurement of stray radiance in the High Altitude Observatory's Skylab Coronagraph", Applied Optics, vol. 16, No. 4 1977, p. 931-937.
Hahn, et al., "Clementine Observations of the Zodiacal Light and the Dust Content of the Inner Solor System", ICARUS, vol. 158, No. 2 2002, pp. 360-378.
Vives, et al., "Formation flyers applied to solar coronal observations: the SPICS mission", Proceedings of Spie, Spie, US, vol. 5901, Jan. 1, 2005.

* cited by examiner

METHOD OF SOLAR OCCULTATION

The present invention relates to a method of solar occultation, and more particularly to a method of solar occultation in space, employing a single spacecraft. The invention also relates to a method of controlling a spacecraft, to a spacecraft, and to a solar coronagraph.

Certain celestial bodies such as the Sun and other stars have a corona, or plasma atmosphere, around their exterior. The study of this atmosphere, coronagraphy, can yield understanding of the star's composition and can provide other information about the star, including temperature and magnetic field data.

The coronas of bright celestial bodies are usually obscured by the light which they emit directly. In the case of the Sun, for example, the light from the corona is more than a million times weaker than the direct light from the disc. In such cases, it is necessary to block out or occult the direct light from the main disc in order to observe the corona, and this is done using a coronagraph. A coronagraph can take many forms, but in all cases an occulting disc or mask is placed between the celestial body and the observer so that the direct light from the main disc is occulted.

A form of coronagraph occurs during solar eclipses when the Moon occults the Sun. When viewed from Earth, the Moon coincidentally has approximately the same diameter as the Sun and therefore the Moon forms a very suitable occulting disc. Total eclipses have provided useful opportunities to perform solar coronagraphy, however they are rare events occurring on average only every approximately 18 months, and recurring on average at any given place on the Earth only every 370 years. One major problem with total solar eclipses, however, is their short duration, which is typically no more than about seven minutes in a given location and is usually much shorter. This means that longer term phenomena cannot be observed from the same point on the ground. This can be extended by flying an aircraft in a trajectory which follows the Moon, but even this is limited to just over 1 hour and that was a one-off when the Concorde prototype was serendipitously available for the 1973 eclipse over Africa. Therefore, coronagraph instruments such as Lyot coronagraphs have been developed which use a variety of different techniques to create an "artificial eclipse" for viewing the corona.

Two limiting factors occur with all Earth-based coronagraphy, both in total eclipses and from Lyot coronagraphs: atmospheric seeing and scattering. Atmospheric seeing is the blurring and twinkling of astronomical objects caused by turbulent mixing in the Earth's atmosphere carrying the optical refractive index. Scattering is caused by sunlight scattered off the atmosphere or ground which is outside of the occulted umbra region, but which is incident into the detector optics. This scattered sunlight is much more of an issue in ground-based Lyot coronagraphs than with total eclipses, even at high altitude, making them unsuitable for certain visible light observations of phenomena in the inner corona which require high sensitivity.

Problems such as atmospheric seeing and scattered atmospheric/surface sunlight have been overcome through space-based Lyot coronagraphs, such as the LASCO coronagraph on the Solar and Heliospheric Observatory (SOHO). However, such coronagraphs have limited resolution particularly for observations in the lower corona. This is due to the instrument's small occulter diameter and subsequent short baseline (i.e. the distance between the occulter and the aperture) which leads to vignetting and stray light effects. Vignetting is a variable cat-eye effect in the field-of-view, as a result of the limited geometrical dimensions of the occulter and baseline. Stray light effects result from the diffraction fringe around the small occulting disc.

The above problems with space-based coronagraphs seriously degrade the spatial resolution when viewing the inner part of the corona, which is of more interest because of the small scales of the coronal structures. Simple geometric considerations show that the imaging performances are linearly driven by the distance D between the occulter and the optical pupil. For example, the energy coming from the bright diffraction fringe surrounding the occulter which is collected by the pupil decreases linearly as D increases.

Coronagraph SOHO/LASCO-C2 (D=75 cm, pupil diameter=2 cm) is the best externally-occulted coronagraph presently in orbit, but is limited to detecting the corona down to about 2.2 Sun radii. STEREO is a solar observation mission comprising two spacecraft orbiting the Sun in different positions and orbits relative to the Earth. An instrument package on each of the STEREO spacecraft is SECCHI, or Sun Earth Connection Coronal and Heliospheric Investigation. With coronagraph STEREO/SECCHI/COR-2, attempts to decrease the inner limit for coronal detection to about 1.5 Sun radii have resulted in a significant increase of stray light. While this stray light can be subtracted, the associated photon noise remains, and irremediably buries the low contrast coronal structures. In practice, the images are only really useful beyond 4 Sun radii.

A longer-baseline, space-based coronagraph has been proposed by the European Space Agency as part of its PROBA project. PROBA-3 is proposed to employ two spacecraft flying in formation with one spacecraft being positioned to occult the Sun's disc while the other observes the Sun's corona from the artificial eclipse using its telescope. The project has suggested that baselines greater than 100 meters will be beneficial, with no apparent maximum. However, the cost and complexity of this project will be high. The technology necessary to achieve precise control of two spacecraft flying relative to one another will be complex. Two different types of spacecraft will also be needed, and the cost of constructing, launching and controlling them in orbit will be very high relative to a conventional coronagraph.

The applicants have therefore identified a need for a longer-baseline, space-based coronagraph which addresses the above issues.

The solution to the above-identified problems in the field of coronagraphy which is provided by the present invention is also useful in other areas of space-related observation or experimentation. Such areas include, but are not limited to, general relativity experiments, observation of Sun-grazing comets, observation of celestial bodies in the line of sight close to the Sun's surface, measurements of the space environment, measurements of the solar diameter, and other observations of the Sun or the field of view surrounding the Sun.

In accordance with one aspect, the invention provides a method of solar occultation employing a spacecraft, the method comprising controlling the spacecraft to achieve a position within a target zone relative to a celestial body such that the celestial body occults the Sun, and observing the Sun or the space around the Sun from the spacecraft.

In accordance with another aspect, the invention provides a method of controlling a spacecraft to achieve a position within a target zone relative to a celestial body to enable observation from the spacecraft of the Sun or the space around the Sun by occultation of the Sun by the celestial body.

As discussed above, the preferred application for the method of the present invention is the observation of the Sun's corona. However, more broadly, the method of the invention allows observations of the Sun itself (such as at the edge of the Sun's disc or another part of the surface) or the space around the Sun. The "space around the Sun" is intended to mean the region of space whose view from the observation point is enhanced by occultation of the Sun's bright disc. Typically, this region may extend out to about three solar radii.

While the remainder of the description refers to coronagraphy, the skilled person will appreciate that other applications such as those discussed above will be equally possible with the invention. For example, by occulting the Sun's disc, celestial bodies which were not previously visible may be observed or it may be possible to observe or measure other features or phenomena such as the Sun's diameter, solar flares, or the behaviour of light under certain conditions.

The celestial body provides the effective occulting disc for the "giant coronagraph" of the present invention. While many celestial bodies such as planets and moons, including all of those in our solar system, may yield acceptable results, preferably the occulting celestial body has little or no atmosphere in order to provide an occulting disc having as sharp an "edge" as possible. In addition, the celestial body is preferably spherical, or nearly spherical, so that the occulting disc is circular or nearly circular.

A preferred celestial body is the Moon, but other moons or planets are envisaged to be suitable, including Mercury.

Eclipses or occultations generally fall into three categories: total, partial and annular. In a total eclipse, the occulting celestial body completely obscures the disc of the Sun. The zone behind the occulting body in which a total eclipse can be observed is known as the umbra. In an annular eclipse, the occulting body appears smaller than the disc of the Sun when viewed from the observation point, so that a ring or annulus of the disc is visible at the point of maximum overlap. The zone in which an annular eclipse is seen is referred to as the antumbra. The umbra and antumbra are cones, with their points touching and their axes coaxial with each other and with the axis between the centres of the celestial bodies. A partial eclipse is where only part of the Sun's disc is obscured, as will be seen from a zone called the penumbra, which lies outside the umbra and antumbra.

It will be understood that if a spacecraft is positioned behind the celestial body, in the umbra or antumbra, on the axis which connects the centres of the celestial body and the Sun, the view of the occulted Sun (and/or its corona) will be symmetrical. For practical reasons, it may not be possible or desirable to maintain the spacecraft precisely on that axis. Furthermore, it may be the case that a fully symmetrical view of the corona is not necessary, and that provided the limit of occultation at one or more points around the circumference of the occulting disc is within a specified range, an offset observation position is entirely acceptable. Taking this a stage further, it may be the case that only a section of the corona needs to be observed and that therefore a greater level of offset may be acceptable with higher degrees of occultation outside the sector of interest being permissible.

The Sun has a radius referred to as Rs, which for the purposes of this application will be the same as the radius of the main disc of the Sun as seen from the observation point. The corona will therefore extend from Rs outwards, possibly to a distance which is several multiples of Rs. If the lower corona is to be observed, it will be necessary to observe from around Rs outwards, or possibly from a radius slightly lower than Rs if the surface of the Sun is to be seen. Alternatively, it may be acceptable for a radius greater than Rs to be occulted if only the corona or part of the corona, such as the upper corona for example, is to be observed.

In summary, the location and boundaries of the target zone within which the spacecraft is controlled to fly when making observations of the Sun and its corona while it is being occulted will depend on the desired or permissible limits for the radius of occultation and for any offset, as discussed above. Accordingly, observation positions within the umbra, antumbra or penumbra are possible.

Preferably, the target zone is defined as the zone within which, when observed from the spacecraft, the celestial body occults the Sun above about 1.00 Rs around the entire circumference of the effective occulting disc formed by the celestial body, since the Sun has a very bright disc compared to its corona and therefore it may be preferable to occult the disc completely. This latter minimum occultation level in effect places the target zone and acceptable points of observation entirely within the umbra.

As discussed above, the corona extends from Rs outwards, and the target zone may be further defined by a maximum permissible radius of occultation, expressed in multiples of Rs. For example, if the corona outwards from 2.0 Rs is to be observed, the maximum permissible extent of occultation would be 2.0 Rs or possibly slightly less in preferred embodiments (allowing for any edge-effects immediately adjacent the occulting disc). Other maximum permissible extents of occultation may be 2.2 Rs, 1.5 Rs, 1.1 Rs, 1.075 Rs, 1.05 Rs or 1.02 Rs. The skilled person will appreciate that these limits may not need to be exactly precise, depending on the particular circumstances. The maximum permissible limit could be required around the entire circumference of the effective occulting disc, or it may only be necessary along an arc of the circumference or even just at a point on the circumference, if only a sector of the corona is to be observed.

In particularly preferred embodiments where the majority of the corona is to be observed, the target zone is defined as the zone within which, when observed from the spacecraft, the celestial body occults the Sun to an extent no greater than 1.05 Rs, and preferably no greater than 1.02 Rs, at at least one point on the circumference of the effective occulting disc formed by the celestial body. In more preferred embodiments, the limit applies to an arc on the circumference or alternatively to the entire circumference.

In most practical embodiments, the minimum limit of occultation discussed above (1.00 Rs) will also apply in combination with a maximum limit, to provide a range of radii within which the edge of the occulting disc may lie, either at a point, along an arc, or around the entire circumference of the disc. A combination of a minimum limit of 1.00 Rs with a maximum limit will define the target zone for the spacecraft position as a sub-zone of the conical umbra. As will be explained further in relation to a preferred embodiment below, the target zone in this case will have the form of an "arrowhead" within the umbra when viewed in section if it is only necessary for the range to apply at at least one point on the circumference of the occulting disc. If the edge of the occulting disc must lie within the defined range of radii around the entire circumference, the target zone will lose the side lobes of the arrowhead and will become a diamond or kite-shaped in section.

In order to achieve the levels of occultation described above, the orbit of the spacecraft is generally above an altitude of 100 km above the Earth's surface, and at a distance of the order of thousands of kilometers from the celestial body such as the Moon. Such a distance provides the advantages of a long baseline system in terms of reduced stray light effects, but also increases the size of the target zone, which in turn maximises the time which the spacecraft can spend within the target zone. The spacecraft should spend a longer duration within the target zone than a natural eclipse (i.e. which does not Non-Keplerian manoeuvres to maintain totality) allows, during any particular observation cycle. Preferably this duration in the target zone should be at least several hours, to enable sufficient measurements to be recorded effectively. Longer durations of many hours to days are even more desirable from a scientific return perspective. These longer durations are possible with the arrangement of the present invention.

The position of the target zone relative to the celestial body has been discussed above in some detail, in relatively static terms. Armed with details of the location and physical extent of the desired target zone, it will then be necessary physically to position an observing spacecraft in that target zone. While it is possible for a person skilled in spacecraft flight path design to design a flight path for the spacecraft which passes through the target zone, it is more challenging in practice to devise a scheme to maintain the position of the spacecraft within the target zone.

The term "Keplerian orbit" is used to describe the natural motion of an orbiting body in a single, central, inverse square gravity field. The orbit can be elliptic, parabolic or hyperbolic. A continuous Keplerian orbit (i.e. a closed orbit) around a body will always be elliptical (which, at one end of the scale could be circular) whereas purely parabolic and hyperbolic orbits will be open in the sense that once the orbiting body has reached its closest point to the body being orbited, the two will separate again to infinity. A non-Keplerian orbit is one where additional forces act continuously on the orbiting body. These can either arise from natural sources (e.g. other planets or celestial bodies) or from continuous spacecraft propulsive forces. In the context of the invention when in the target zone, natural sources of perturbation are neglected and so the term non-Keplerian orbit is used to describe those orbits continuously under the influence of spacecraft translational thrust. The orbit of a spacecraft which periodically applies translational thrust in one or more directions may comprise Keplerian and non-Keplerian sections.

While it may theoretically be possible to maintain a spacecraft's position continuously within the target zone, this would require significant active control of the spacecraft's position and/or speed such that it is considered to be prohibitively expensive for a viable space mission.

While it is possible to find a Keplerian orbit that will maximise the time spent in the target zone, in order for the spacecraft to remain in the target zone for a longer predetermined time, it is likely that the orbit of the spacecraft will need to deviate from a natural, Keplerian orbit due to required changes in position and/or speed at one or more points. Therefore, when considered as a whole, the spacecraft's orbit is based on a Keplerian orbit (ranging from highly elliptical to mildly hyperbolic, the details depending on the specific timing and location of the encounter). Either a series of small, discrete manoeuvres or a continuous manoeuvre are then required to dwell in the target zone for an extended period. The result is a non-Keplerian orbit (in the case of continuous propulsion) or a series of modified Keplerian orbits (modification occurring after each small manoeuvre), which will permit positioning of the craft within the target zone for a predetermined time, longer than would be the case with a Keplerian orbit.

The time integral of the propulsive acceleration required to execute the necessary change in the spacecraft speed is known as 'DeltaV' and is therefore a measure of the effort required of the spacecraft. The spacecraft's motion within the target zone may, for example, include one or more sections of Keplerian motion (elliptic, parabolic, hyperbolic) and one or more sections of non-Keplerian motion during which Delta V is applied to the spacecraft. The non-Keplerian motion and/or discrete manoeuvre sequence may occur near to or within the target zone, with the aim of prolonging the period for which the spacecraft remains in the target zone.

During the sections of non-Keplerian motion and/or discrete manoeuvre sequence, it will be necessary to actively control the spacecraft's position and/or speed through the application of Delta V. For this purpose, the spacecraft is preferably provided with means for adjusting and controlling its position and/or speed, such as means for applying Delta V. Preferably this comprises one or more thrusters.

The specific case of the Moon being the occulting celestial body presents some unique challenges, due to the relative proximity of the Earth. These challenges may of course equally apply to moons of other planets, but the Earth/Moon case will be used as the main, and most likely, example.

Because the Moon rotates around the Earth and the Earth rotates around the Sun, the target zone in this case will be "dynamic" in the sense that it will move with the Moon. An observing spacecraft will therefore have to move with the Moon and match its motion, as closely as possible, while in the target zone.

Preferably, the spacecraft's orbit is Earth centred. Whilst in the target zone, the spacecraft therefore lies within the Earth's sphere of influence. As discussed above, the orbit preferably has Keplerian and non-Keplerian sectors. It can best be described as Keplerian with a sequence of modifications via discrete manoeuvres or continuous propulsion. Generally however, the instantaneous state of the orbit will be such that it can range between highly elliptical and mildly hyperbolic, with the Earth located at one of the focal points of the orbit.

The ecliptic plane is the plane in which the Earth travels around the Sun. The Moon's orbit is inclined relative to the ecliptic plane, by about 5 degrees. During its orbit, the Moon will cross the ecliptic plane and at this time, the presence of the Earth in the plane may interfere with observations of the Sun. Preferably therefore, the spacecraft's orbit is also inclined relative to the ecliptic plane so that observations of the Sun when occulted by the Moon can be carried out outside the ecliptic plane. Apart from this relatively small exclusion (plus or minus about 15 degrees in orbital longitude on either side of each ecliptic crossing), the Moon can be anywhere in its orbit around the Earth for observations to take place.

The spacecraft orbit plane may be inclined at an angle greater than, the same as, or less than the angle of the Moon's orbit relative to the ecliptic plane to achieve a position in the target zone, depending on where the Moon is in its cycle when the observations take place.

Preferably, the spacecraft's orbit is configured such that its closest point to the Earth, or perigee, is within the target zone. In a further preferred embodiment, the perigee of the orbit is located on the Sun-Moon axis within the target zone, ideally near or at the limit of the target zone closest to the Moon on the axis.

At its perigee, which lies along the Sun-Moon direction, the spacecraft will achieve a speed such that it is instantaneously co-rotating with the Moon as seen from the Sun.

As discussed above, in addition to the general orbit of the spacecraft, it is desirable to control the spacecraft's motion such that it can remain in the target zone for as long as is convenient or practicable. The line between the Moon and the Sun is defined as the x-direction, the y-direction is orthogonal to this and in the plane of the spacecraft orbit, and the z-direction is orthogonal to both the x- and the y-directions.

In the case where the occultation limit is between too Rs and 1.02 Rs around the entire circumference of the occulting disc, the longitudinal dimension (i.e. in the Sun-Moon direction) of the diamond or kite-shaped target zone referred to above will be approximately 7000 km. At its widest point, however, the width of the target zone will only be about 32 km and this therefore requires relatively precise control of the spacecraft.

As will be seen below, an orbit can be selected for the spacecraft such that, when observing the component of the spacecraft's natural movement along the x-direction (the Sun-Moon axis) in the x-y plane, the craft enters the target zone at the point furthest from the Moon (i.e. the distal apex of the kite, which is also the apex of the umbra), continues to travel towards the Moon for a distance of 7000 km to its perigee, at which point it reverses direction back towards the apex, finally exiting the target zone at the apex. With an appropriate orbit, this movement can take approximately two days.

During this time, a small amount of Delta V will be necessary in the z-direction to maintain the spacecraft's position within the width of the target zone in the x-z plane. This is because the plane of the spacecraft's motion and the plane of the Moon's motion, both measured relative to the Earth, are not generally identical, potentially resulting in a progressive separation in the z-direction.

The greatest amount of compensation will be necessary in the y-direction, in order to keep the spacecraft within the relatively narrow width of the target zone in the x-y plane for as much of the time as possible that its position is within the longitudinal limits of the zone along the x-direction. In the specific example discussed below, the natural motion of the spacecraft in the y-direction relative to the Moon would have a width of about 500 km centred on the Sun-Moon axis (the x-axis). This would be almost completely outside the target zone, which has a maximum width of 32 km. With suitable Delta V in the y-direction, it would be possible to maintain the spacecraft within a zone of less than a kilometer centred on the x-axis, and in preferred embodiments within a zone of less than 100 meters or even around 20 meters or less.

Preferably therefore, the spacecraft is controlled to remain within the target zone for a predetermined period by controlling the motion of the spacecraft in the y-direction as defined above. Also, as discussed above, the spacecraft is preferably further controlled to remain within the target zone for a predetermined period by controlling the motion of the spacecraft in a z-direction. In preferred embodiments, no control of the spacecraft's motion in the x-direction will be necessary.

As a result of the motion control in the y-direction, the spacecraft maintains its alignment with the Sun-Moon direction, i.e. co-rotation is maintained. Without this control the natural orbit would drift from the co-rotation state.

In accordance with another aspect, the invention relates to a spacecraft configured to achieve a position within a target zone as discussed above. In one preferred embodiment, such a spacecraft could be pre-programmed with flight and orbit data so as to achieve a position within the target zone. The spacecraft could further be programmed with flight and orbit data so as to maintain its position within the target zone for a predetermined time, as discussed above.

In accordance with a further aspect, the invention provides a solar coronagraph comprising a spacecraft and a celestial body, preferably the Moon, for observing the corona of the Sun from the spacecraft, wherein the spacecraft is positioned within a target zone relative to the celestial body such that the celestial body occults the Sun to enable observation of the corona. Preferably, the spacecraft adopts a non-Keplerian orbit to remain within the target zone for a predetermined time, longer than would be the case with a Keplerian orbit.

By positioning a spacecraft within a target zone relative to a celestial body such as the Moon to occult the Sun, a long-baseline coronagraph can be achieved which overcomes many of the problems encountered with known land- and space-based coronagraphs, including those discussed in the introduction above.

Another benefit of the present invention compared to, for example, the PROBA-3 proposal discussed above is that a much larger zone of totality is provided, which allows multiple instruments to be located in the target zone for performing multiple observations or experiments. In missions where another spacecraft is the occulter, the totality region is likely to be so small that it will only be possible to place a single instrument in the target zone.

An embodiment of the invention will now be described, by way of example only, with reference to the accompanying drawings, in which.

Figure 1:
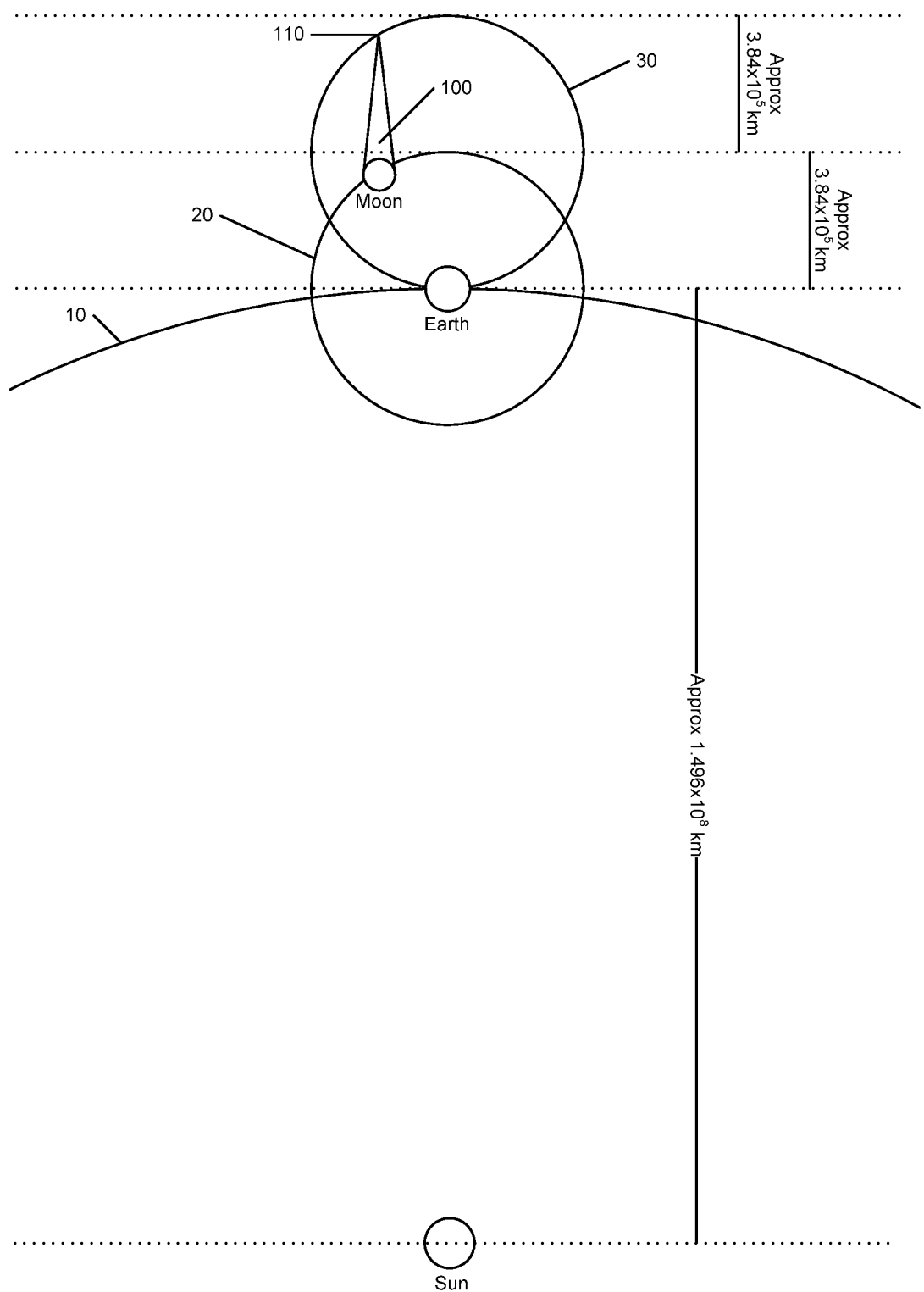
FIG. 1 shows a schematic diagram of the Sun, Earth and Moon viewed from a direction perpendicular to the ecliptic plane.

FIG. 1 shows a schematic diagram of the Sun, Earth and Moon with distances not to scale. This view is looking perpendicular to the ecliptic plane. The Earth travels around the Sun in an orbit 10. The Moon travels around the Earth in an orbit 20, which is shown schematically as a circle although in reality it is elliptical. The Moon creates a cone-shaped shadow or umbra 100 behind it where the Sun's disc is occulted. The maximum extent of the umbra 100 is the tip 110 of the cone. Tip 110 traces out its own virtual orbit 30, which is in effect a displaced orbit having the same shape as the Moon's orbit 20 around the Earth.

Figure 2:
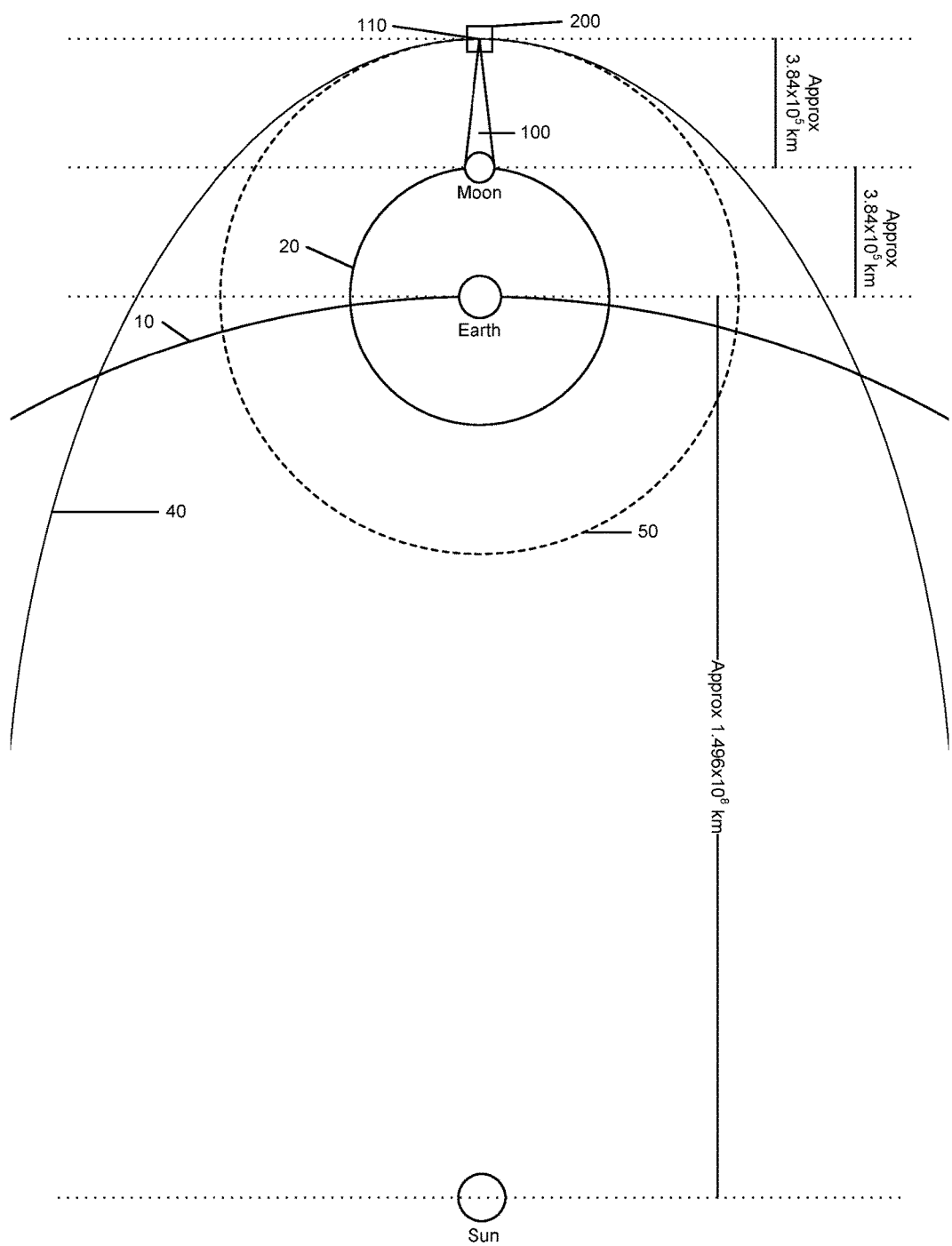
FIG. 2 shows a similar view to FIG. 1, including a desired orbit for the spacecraft in accordance with the invention.

FIG. 2 shows, from the same direction of observation as FIG. 1, the desired orbit 40 for the spacecraft 200 in accordance with a preferred embodiment of the invention. When the Moon is at its furthest point from the Sun, the tip 110 of umbra 100 is at a point which is approximately twice the distance from the Earth as that of the average distance of the Moon from the Earth in its orbit. An orbit 50 at twice the radius of the Moon's orbit is shown in dotted line. Therefore, at this point at least, the orbit 40 of the spacecraft 200 around the Earth is designed to coincide with the umbra 100. The spacecraft is also configured to have a speed at this point which matches that of the Moon plus the additional effect of the Sun rotating with respect to the Moon. To achieve this, the spacecraft must lie in a highly elliptical/mildly hyperbolic orbit with its perigee intersecting the umbra 100. The plane of the elliptical orbit lies between the ecliptic plane and the Moon's orbit plane about the Earth, depending on where in the Moon's orbit the occultation occurs.

Figure 3:
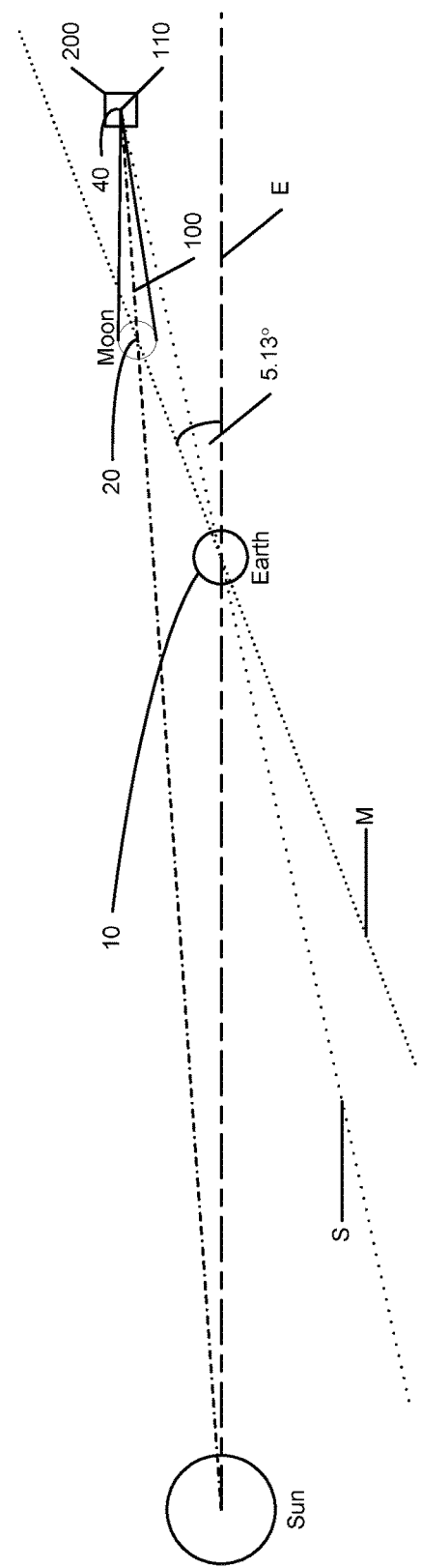
FIG. 3 shows the arrangement of FIG. 2 viewed from a direction along the ecliptic plane.

FIG. 3 shows the arrangement of FIG. 2 but looking along the ecliptic plane E, which contains the orbit 10 of the Earth around the Sun. The Moon's orbit 20 is inclined relative to the ecliptic plane E by 5.13 degrees as shown by the Moon orbit plane M. The spacecraft 200 travels in its orbit 40 around the Earth in a plane S, which is also inclined relative to the ecliptic plane E but by an angle less than that of the Moon's orbit M.

Figure 4A:
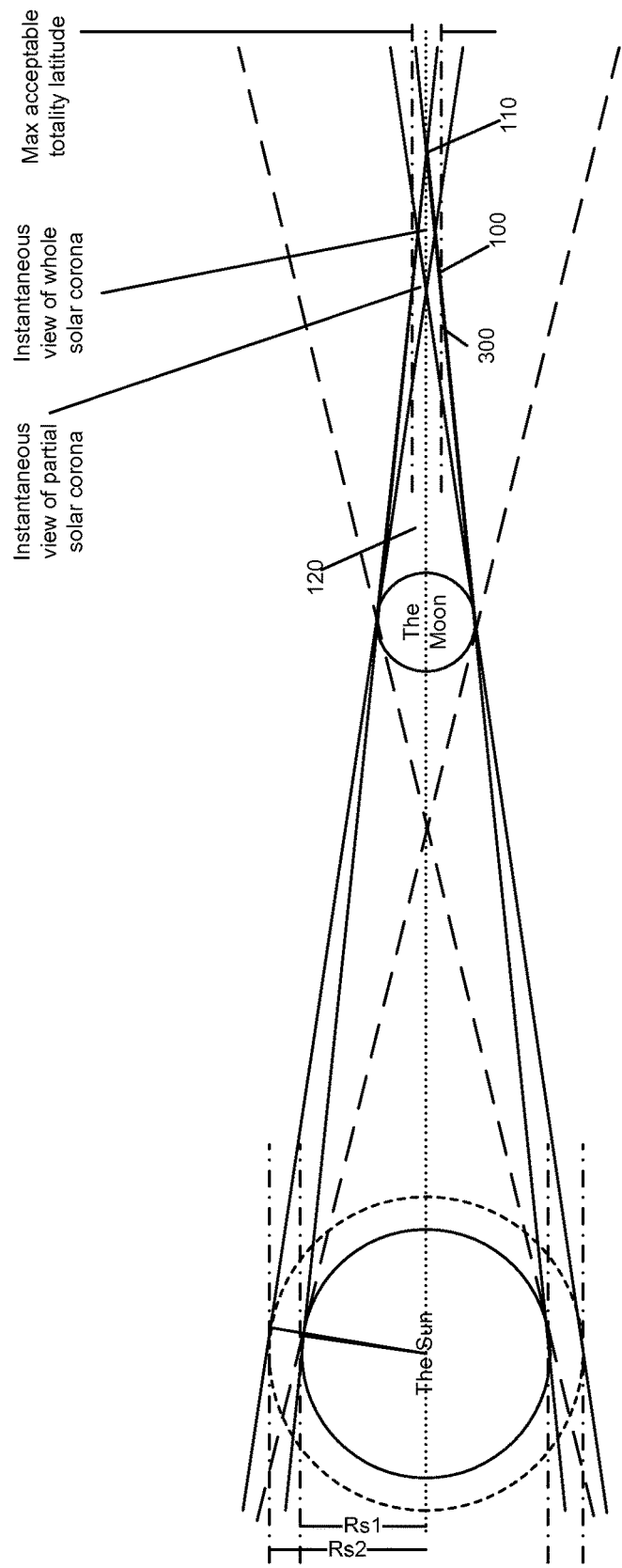
FIGS. 4a and 4b show schematically the Sun, Moon and the target zone viewed from a direction along the ecliptic plane.
Figure 4B:
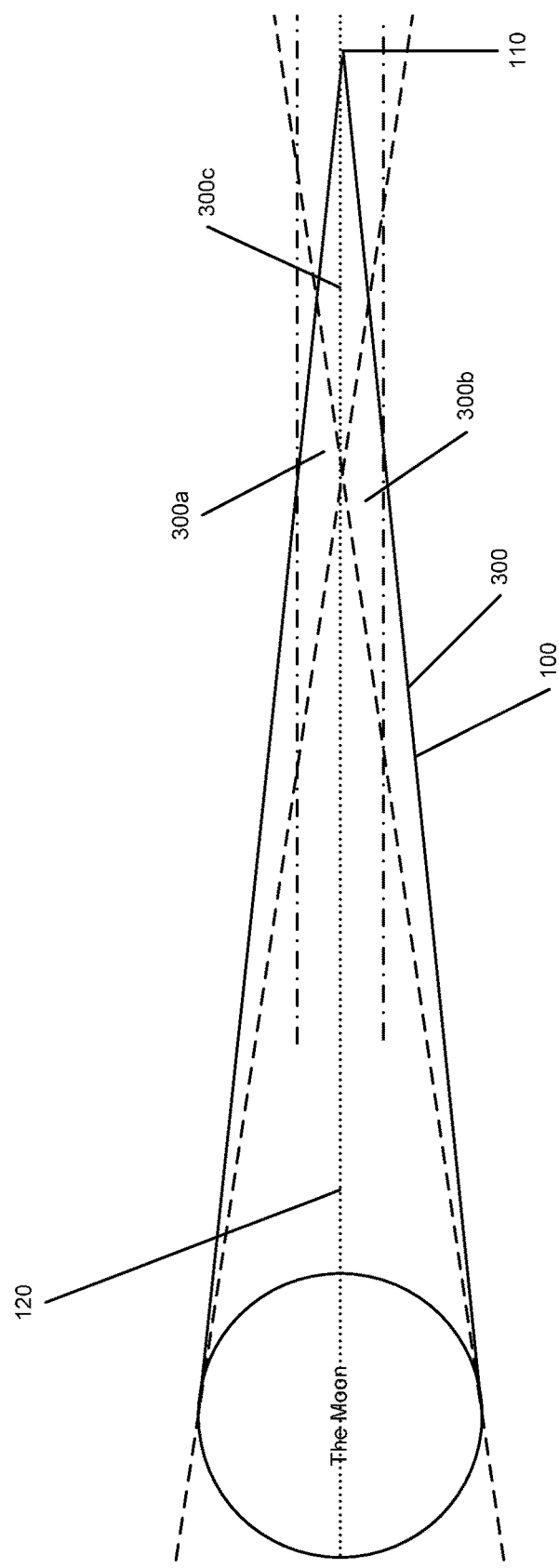

Control of the spacecraft during the occultation period will be discussed further below, but first the geometry of the target zone 300 will be described with reference to FIGS. 4a and 4b. FIG. 4b is an enlargement of the target zone 300 shown in FIG. 4a. As mentioned in the introduction, the main disc of the Sun has a radius Rs which in the example of FIG. 4a is equal to Rs1, although this not need be the case and Rs1 could be smaller or larger than Rs depending on what is being observed. In this example, the umbra 100 covers all locations where the Moon occults at least the main disc of the Sun and therefore covers all locations where Rs1 is the minimum level of occultation. Umbra 100 is triangular in section, having its apex at tip 110 furthest from the Moon.

In the preferred embodiment, a maximum limit of occultation is also required, the radius for which is shown as Rs2 in FIG. 4a. By virtue of this maximum limit, any point of observation at which the entire circumference of the Sun is occulted in excess of radius Rs2 is excluded from the target zone 300, which effectively excludes the small triangle 120 from the umbra 100 to result in an "arrowhead" shape in section. The arrowhead is formed by sub-zones 300a, 300b and 300c of target zone 300 (FIG. 4b). Observation points within sub-zones 300a and 300b will only see part of the corona from an "acceptable" radius of between Rs1 and Rs2 and outwards, since the rest of the corona will be occulted up to a radius greater than Rs2.

If it is desirable to apply the occultation radius minimum Rs1 and maximum Rs2 around the entire circumference of the occulting disc formed by the Moon, it will be necessary to position the observation point within sub-zone 300c, which is the kite-shaped zone (in section) referred to in the introduction.

In the remaining description, sub-zone 300c will be referred to as the target zone 300c because this is ideally where the spacecraft 200 can be controlled to remain for the duration of the occultation period, in order to observe the corona around the entire circumference of the occulting disc. For a Sun-Moon system, target zone 300c is about 7000 km in length along the Sun-Moon axis and about 32 km in width at its widest point where Rs1 is 1.00 Rs and Rs2 is 1.02 Rs.

Figure 5:
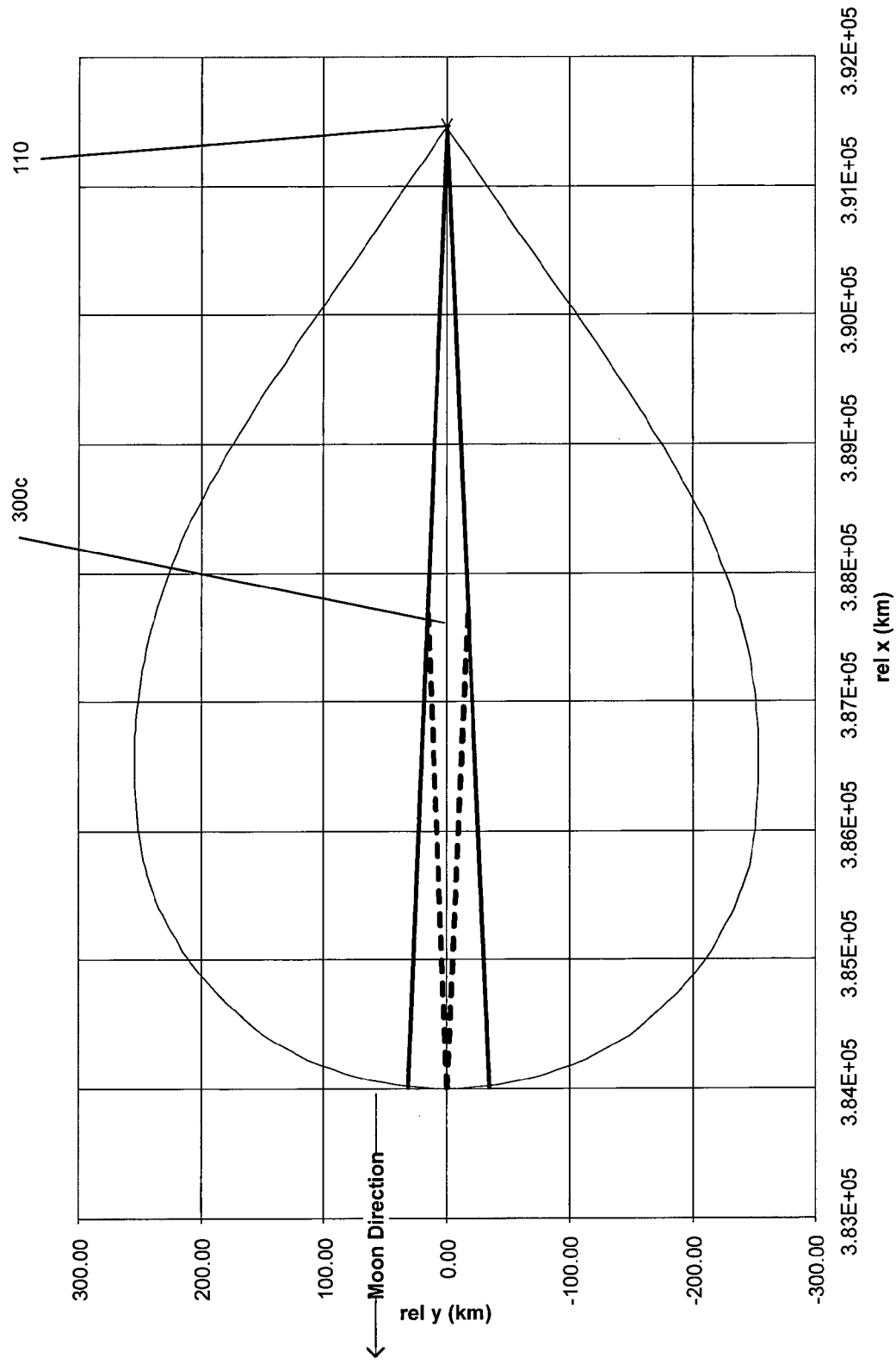
FIG. 5 shows a diagram of the spacecraft's uncontrolled position relative to the Moon in the x-y plane over a two-day occultation period.

As discussed above, the line between the Moon and the Sun is defined as the x-direction, the y-direction is orthogonal to this and in the plane of the spacecraft orbit, and the z-direction is orthogonal to both the x- and the y-directions. FIG. 5 shows a diagram of the spacecraft's position relative to the Moon in the x-y plane over a two-day occultation period. This diagram shows the typical natural motion of the spacecraft when in the orbit discussed above, relative to the Moon.

At the start of the occultation period (perigee minus one day), the spacecraft is positioned at the tip 110 of the target zone 300c or umbra 100. Because the spacecraft is in an elliptical orbit, it will initially move closer to the Moon in the x-direction up to perigee and then move away again. The speed of the spacecraft at perigee will be the fastest in its orbit, so prior to perigee the spacecraft will accelerate and after perigee it will decelerate. The speed of the spacecraft in the y-direction at perigee is configured to be close to that of the Moon. However over the two-day occultation period the x-axis (the Sun-Moon axis) rotates about the Sun relative to its initial orientation because of the movement of the Moon and the Earth during that time. The resulting relative motion is as shown in FIG. 5.

The motion starts at the 'tip' one day before perigee, reaching the minimum displacement along the x axis at perigee. Therefore, its relative position in the y-direction will initially go beyond the x-axis, before reversing to cross back over the x-axis at perigee. The spacecraft returns to the 'tip' one day after perigee.

As can be seen from FIG. 5, the uncontrolled relative motion of the spacecraft is almost entirely outside the target zone 300c, with only the two extreme points along the x-axis being encountered. This is not surprising since the width of the path of the spacecraft is about 500 km whereas the maximum width of the target zone 300c is 32 km. However, it can be seen that the relative motion along the x-axis is acceptable for a two-day occultation period since the spacecraft stays within the 7000 km extent of the target zone 300c along the x-axis. As far as the x-y plane is concerned therefore, control only in the y-direction is needed.

Figure 6:
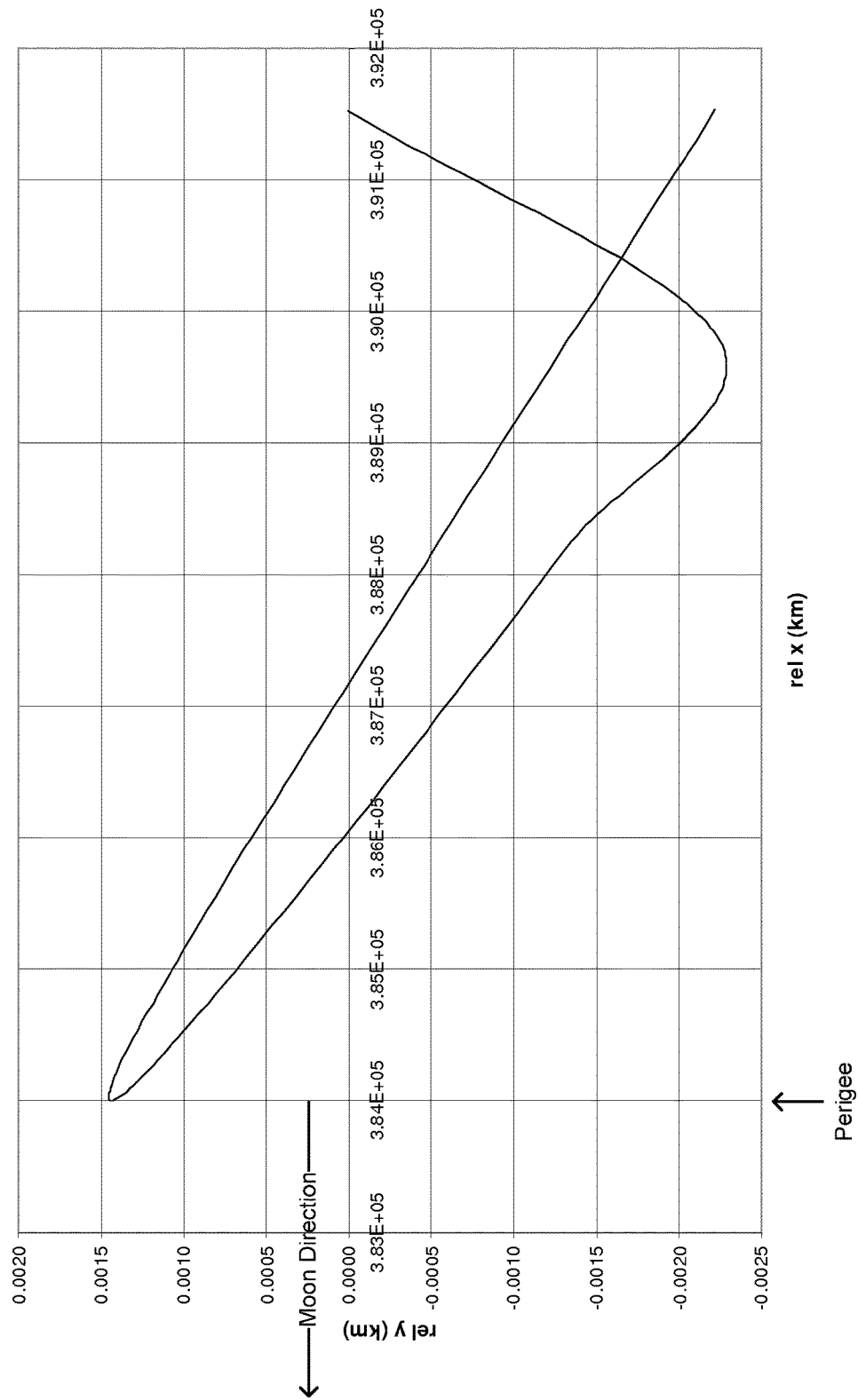
FIG. 6 shows a diagram of one possible controlled position orbit of the spacecraft relative to the Moon in the x-y plane over a two-day occultation period, in accordance with the invention.

With reference to FIG. 6, an example of the result of the application of appropriate Delta V in the y-direction is shown. The manoeuvres (i.e. Delta V) can either be continuous or executed periodically (typically every 3 hours), but with either method the aim is to adjust the angular velocity of the spacecraft to eliminate angular motion relative to the x-axis. In the preferred embodiment, the Delta V required for this control typically lies in the range of 50-60 m/s, the exact value depending on the frequency of manoeuvre. With reference to the y-axis scale shown in FIG. 6, Delta V control in the y-direction can reduce the orbit deviation significantly. In the example shown the motion in the y direction is reduced to a few meters in total. The extent of this motion depends on the detail of the control strategy adopted and consequently the DeltaV.

Figure 7:
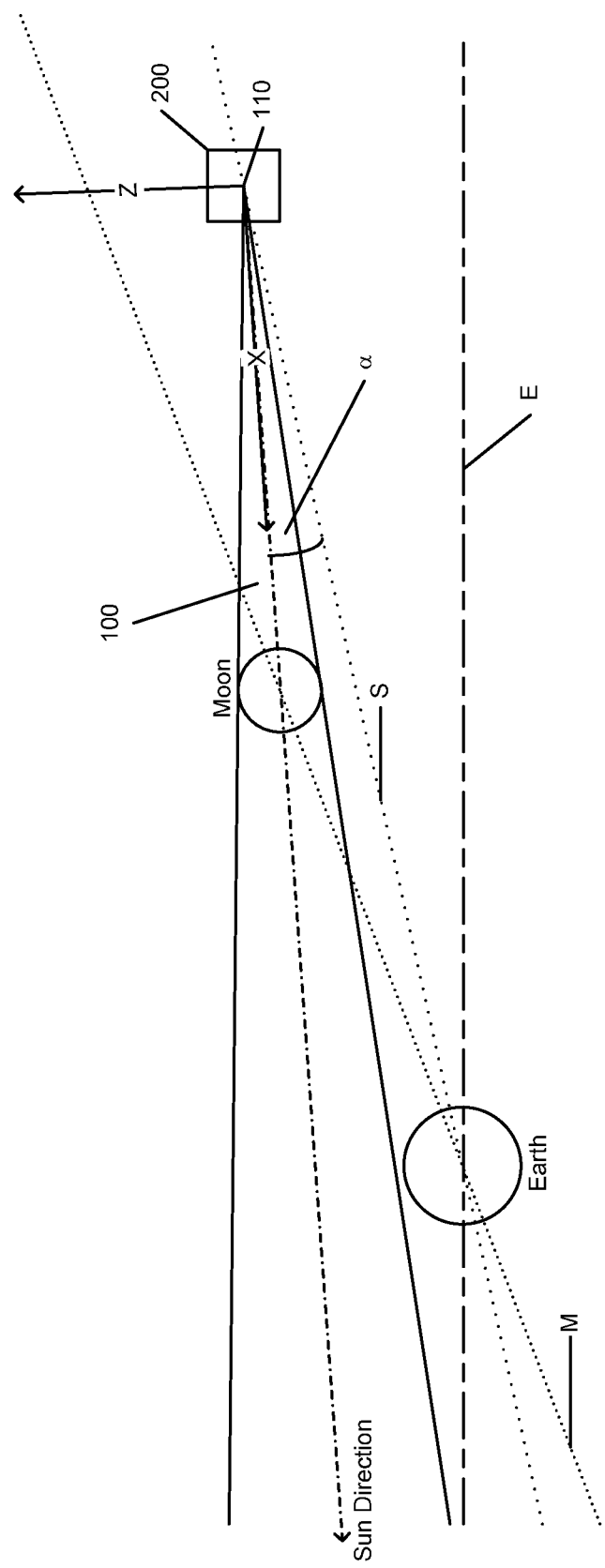
FIG. 7 is a similar view to that of FIG. 3, viewed from a direction along the ecliptic plane, showing the x and z directions.

FIG. 7 is a similar view to that of FIG. 3, looking from the side, in the direction of the ecliptic plane E and the y-axis. The plane of the Moon's orbit around the Earth is shown as M and the plane of the spacecraft's orbit is shown as S. The x-direction is along the Sun-Moon axis and the z-direction is orthogonal to this and to the y-direction. The relative angles between the planes have been exaggerated in FIG. 7, but the figure is intended to illustrate that the Sun-Moon direction (the x-axis) is not in the same plane as the spacecraft orbit and that there is an angle α between them. If the only control on the spacecraft during the occultation period were in the y-direction discussed above, the Moon would appear to move in a direction perpendicular to the orbit plane of the spacecraft.

Therefore, as the spacecraft moves in the x-z plane during the occultation period, a small amount of Delta V will be necessary in the positive or negative z-directions to adjust the spacecraft's natural motion in that direction so that it travels instead close to the x-axis in the x-z plane, and therefore stays within the width of the target zone in that plane. This adjustment is achieved by a further sequence of either continuous or discrete manoeuvres over the observation period in the z-direction, which is almost perpendicular in reality to the spacecraft's orbit plane. This out-of-plane compensation can be similar to the in-plane compensation for the y-direction, in the example of a 7000 km target zone, so the Delta V would therefore be in the range of 50-100 m/s. These manoeuvres could be combined with the in-plane control, resulting in a total manoeuvre Delta V of around 100-150 m/s.

Figure 8:
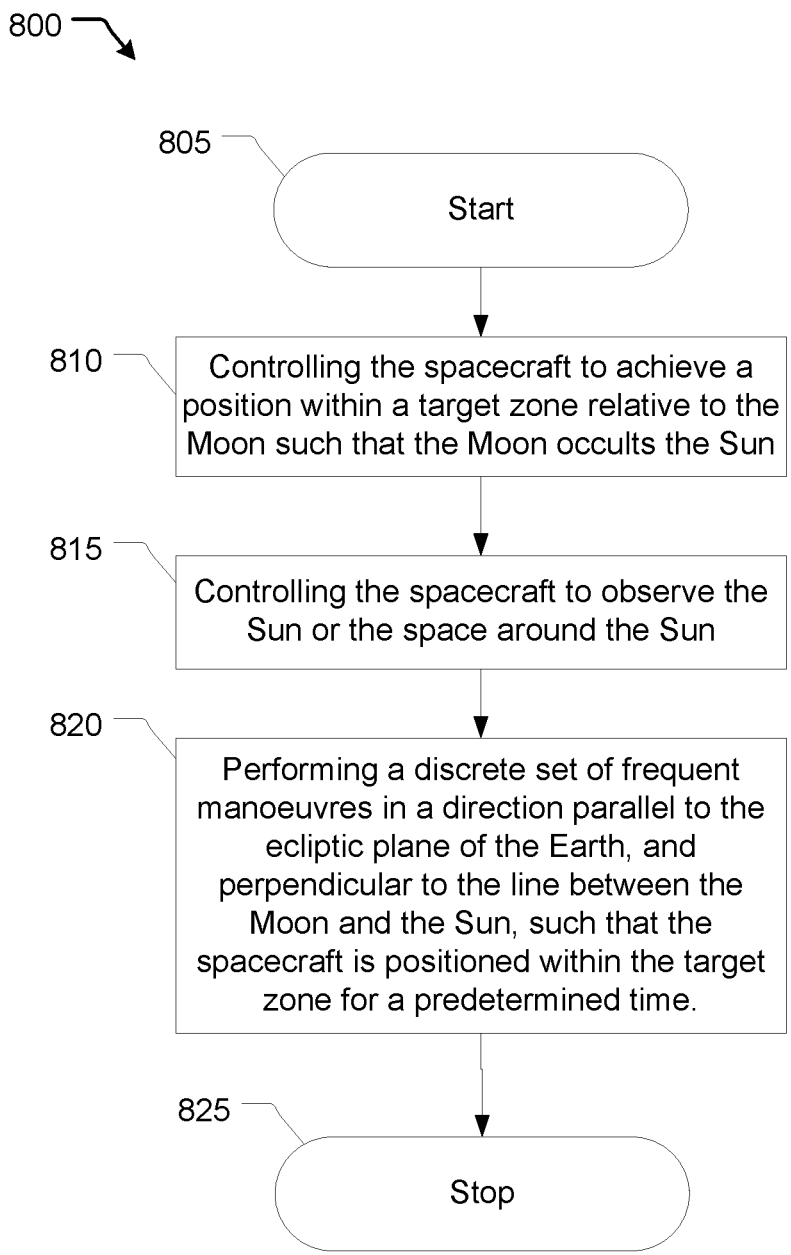
FIG. 8 illustrates a flowchart for a method of solar occultation employing a spacecraft.

FIG. 8 illustrates a flowchart for a method of solar occultation employing a spacecraft. The method 800 begins at 805. The method 800 controls the spacecraft to achieve a position within a target zone relative to the Moon such that the Moon occults the Sun 810. Next, the method 800 controls the spacecraft to observe the Sun or the space around the Sun 815. The observation of the Sun may include observing the Sun's corona. Further, the Sun, as observed from the spacecraft, may have a radius Rs and the spacecraft may be programmed to be positioned in the target zone, for a predetermined time, which is defined as the zone within which, when observed from the spacecraft, the Moon occults an area within the entire circumference of an occulting disc representing the outline of the Moon as observed from the spacecraft, in which the area has a radius of at least 1.00 Rs. The target zone may further be defined as the zone within which, when observed from the spacecraft, the Moon occults an area of the Sun within the entire circumference of the occulting disc, in which the occulting disc is approximately circular, and the radius of the occulting disc is no greater than 1.05 Rs at at least one point on the circumference of the occulting disc. The target zone may further be defined as the zone within which, when observed from the spacecraft, the Moon occults an area of the Sun within the entire circumference of the occulting disc, in which the occulting disc is approximately circular, and the radius of the occulting disc is no greater than 1.05 Rs around the entire circumference of the occulting disc. In another embodiment, the Moon may occult an area of the Sun defined by the circumference of the occulting disc, in which the radius of the occulting disc is no greater than 1.02 Rs. The method 800 then performs a discrete set of frequent maneuvers in a direction parallel to the ecliptic plane of the Earth, and perpendicular to the line between the Moon and the Sun, such that the spacecraft is positioned within the target zone for a predetermined time 820. The line between the Moon and the Sun may be defined as the x-direction, and the frequent maneuvers are applied in the y-direction, and spacecraft is further controlled to remain within the target zone for a predetermined time by controlling the motion of the spacecraft in a z-direction which is perpendicular to both the x- and y-directions. The discrete set of frequent manoeuvres controls the spacecraft to have an orbit within the target zone which is at least partly non-Keplerian or approximating non-Keplerian. The spacecraft may be controlled to orbit the Earth with an elliptical, parabolic or hyperbolic orbit such that, at perigee, the spacecraft is positioned within the target zone. The method then ends at 825.

The invention claimed is:

1. A method of solar occultation employing a spacecraft, the method comprising:
   controlling the spacecraft to achieve a position within a target zone relative to the Moon such that the Moon occults the Sun; and
   controlling the spacecraft to observe the Sun or the space around the Sun,
   wherein the spacecraft is controlled to have an orbit within the target zone which is at least partly non-Keplerian or approximating non-Keplerian via a discrete set of frequent maneuvers in a perpendicular to the line between the Moon and the Sun and in the plane of the spacecraft orbit, such that the spacecraft is positioned within the target zone for a predetermined time.

2. The method of claim 1, in which the Sun's corona is observed from the spacecraft.

3. The method of claim 1, wherein the Sun, as observed from the spacecraft, has a radius Rs and the spacecraft is programmed to be positioned in the target zone, for a predetermined time, which is defined as the zone within which, when observed from the spacecraft, the Moon occults an area within the entire circumference of an occulting disc, representing the outline of the Moon as observed from the spacecraft, in which the area has a radius of at least 1.00 Rs.

4. The method of claim 3, wherein the target zone is further defined as the zone within which, when observed from the spacecraft, the Moon occults an area of the Sun within the entire circumference of the occulting disc, in which the occulting disc is approximately circular, and the radius of the occulting disc is no greater than 1.05 Rs at at least one point on the circumference of the occulting disc.

5. The method of claim 3, wherein the target zone is further defined as the zone within which, when observed from the spacecraft, the Moon occults an area of the Sun within the entire circumference of the occulting disc, in which the occulting disc is approximately circular and the radius of the occulting disc is no greater than 1.05 Rs around the entire circumference of the occulting disc.

6. The method of claim 4, wherein the Moon occults an area of the Sun defined by the circumference of the occulting disc, in which the radius of the occulting disc is no greater than 1.02 Rs.

7. The method of claim 1, wherein the spacecraft is controlled to orbit the Earth with an elliptical, parabolic or hyperbolic orbit such that, at perigee, the spacecraft is positioned within the target zone.

8. The method of claim 1, wherein the line between the Moon and the Sun is defined as the x-direction, and the frequent maneuvers are applied in the y-direction, and spacecraft is further controlled to remain within the target zone for a predetermined time by controlling the motion of the spacecraft in a z-direction which is perpendicular to both the x- and y-directions.

9. A spacecraft configured to achieve a position within a target zone relative to the Moon to enable observation from the spacecraft of the Sun or the space around the Sun by occultation of the Sun by the Moon comprising:
   a thruster; and
   a controller controlling maneuvers of the spacecraft using the thruster,
   Wherein the controller is programmed with flight and orbit data so that the spacecraft is controlled to have an orbit within the target zone which is at least partly non-Keplerian or approximating non-Keplerian via a discrete set of frequent maneuvers in a direction perpendicular to a line between the Moon and the Sun and in the plane of the spacecraft orbit, such that the spacecraft is positioned within the target zone for a predetermined time.

* * * * *